(12) United States Patent
Bohner et al.

(10) Patent No.: US 6,244,371 B1
(45) Date of Patent: Jun. 12, 2001

(54) STEERING SYSTEM FOR NON-TRACK-BOUND MOTOR VEHICLES

(75) Inventors: Hubert Bohner, Boeblingen; Martin Moser, Fellbach; Reinhold Schneckenburger, Rutesheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/388,547

(22) Filed: Sep. 2, 1999

(30) Foreign Application Priority Data

Sep. 2, 1998 (DE) .............................. 198 39 951

(51) Int. Cl.$^7$ ...................................... B62D 5/00
(52) U.S. Cl. ............................ 180/403; 180/406
(58) Field of Search ............................ 180/402, 403, 180/405, 406

(56) References Cited

U.S. PATENT DOCUMENTS

| 5,275,250 | 1/1994 | Müller et al. . |
| 5,862,878 | * 1/1999 | Bohner et al. ............... 180/403 |
| 5,893,427 | * 4/1999 | Bohner et al. ............... 180/403 |
| 6,047,788 | * 4/2000 | Bohner et al. ............... 180/406 |

FOREIGN PATENT DOCUMENTS

| 198 01 393 C1 | * 7/1999 | (DE) . |
| 0 818 382 A2 | * 1/1998 | (EP) . |
| 0 983 926 | * 3/2000 | (EP) . |
| WO 90/12723 | 11/1990 | (GB) . |
| 2 308 107 | * 6/1997 | (GB) . |
| 2 309 675 | * 8/1997 | (GB) . |
| 2 339 178 | * 1/2000 | (GB) . |

* cited by examiner

Primary Examiner—Robert P. Olszewski
Assistant Examiner—Andrew J. Fischer
(74) Attorney, Agent, or Firm—Evenson, McKeown, Edwards & Lenahan, P.L.L.C.

(57) ABSTRACT

A steering system of a non-track-bound motor vehicle having steered vehicle wheels which are operatively connected to a steering handle in normal operation only via an electronic regulating arrangement which checks itself continuously for correct operation. In a manner dependent on a desired-value transmitter actuated by the steering handle and on an actual-value transmitter actuated by way of the vehicle wheels, this regulating arrangement actuates an actuating drive for the steering displacement of the steered vehicle wheels. If the regulating arrangement malfunctions, a positive coupling between the steering handle and the steered vehicle wheels is automatically activated. This also occurs if a characteristic variable correlated with the desired/actual value deviation of the steering angle is outside tolerance thresholds.

11 Claims, 3 Drawing Sheets

STEERING SYSTEM FOR NON-TRACK-BOUND MOTOR VEHICLES

BACKGROUND OF THE INVENTION

This application claims the priority of 198 39 951.0-21, filed Sep. 2, 1998, the disclosure of which is expressly incorporated by reference herein.

The present invention relates to a steering system for non-track-bound motor vehicles, with a steering handle, e.g. steering wheel, actuated by the driver, a steering actuating drive for steering displacement of steerable vehicle wheels, a desired steering-angle transmitter which can be actuated by the steering handle, and an actual steering-angle transmitter which can be actuated by the steerable vehicle wheels. A regulating arrangement controls the steering actuating drive as a function of a comparison between the desired values and actual values of the steering angle and continuously checks itself and sensors interacting with it for malfunctions. A mechanical or hydraulic positive coupling is arranged between the steering handle and the steerable vehicle wheels and, when the regulating arrangement is operating correctly, is opened or remains open (inactive normal state) and, if the regulating arrangement is defective, is automatically closed (active special state).

Known steering systems which operate on the "steer-by-wire" concept are fundamentally familiar and are being developed for future motor vehicles. These systems offer the fundamental advantage that, at least as regards the regulating arrangement and the associated sensors, they are suitable for a very wide variety of vehicles without design modifications. On one hand, virtually any transmission ratio between the actuating displacement of the steering handle and the change in the steering angle of the steered vehicle wheels can be achieved by appropriate programming. There is moreover the possibility of connecting the regulating arrangement to additional sensors in order to automatically allow for or eliminate parameters to be specified, e.g. the effects of side winds.

In order to be able to guarantee the required degree of safety in the event of system faults, provision is made to automatically activate an operating mode for abnormal operation or emergency operation if a fault occurs in the regulating arrangement or signals that are to be evaluated by the regulating arrangement fail. In this operating mode, a positive coupling is provided between the steering handle and the steered vehicle wheels. The steering system thus operates in principle in the manner of a conventional steering system, although the mechanical steering column customary in conventional steering systems can be replaced, if required, by other mechanical systems or by hydraulic systems, in particular hydrostatic systems.

SUMMARY OF THE INVENTION

An object of the present invention is to provide advantageous measures as regards the operating reliability of a steering system of the above-mentioned type.

According to the invention, this object has been achieved by providing that the regulating arrangement activates the special state, i.e. active positive coupling between the steering handle and the steered vehicle wheels, if (i) a deviation which exceeds a first threshold value occurs between the desired value and the actual value of the steering angle and/or (ii) a deviation which exceeds a second threshold value is maintained between the desired value and the actual value of the steering angle for a time to be specified and/or (iii) the time average of the desired/actual value deviation, of the steering angle exceeds a third threshold value during a second time period to be specified.

The invention is based on the recognition of the advantages of monitoring not only the correct operation of the regulating arrangement and the associated sensors but also characteristic variables correlated with the desired/actual value deviation of the steering angle. In this way, a switch is made to the special mode a sufficiently long time before a critical state in the case of creeping functional impairments of the steering system. It is advantageous here that whatever the functional impairments of the actuating drive, e.g. increasing stiffness due to wear or dirt, they cannot impair the safety of the steering system.

According to a preferred embodiment of the invention, the monitored characteristic variables of the desired/actual value deviation of the steering angle are varied as a function of parameters to be specified.

For example, the permissible maximum value of the desired/actual value deviation, i.e. the abovementioned first threshold value, can be reduced as the speed of travel of the vehicle increases and/or as the actuating forces of the actuating unit decrease. This ensures that the steering movements of the steered vehicle wheels are monitored more strictly at a high speed of travel.

Similarly, the second and/or third threshold value can be varied, and the growth with time or speed of a reduction in at desired/actual value deviation can thus be monitored in a corresponding parameter-dependent manner.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
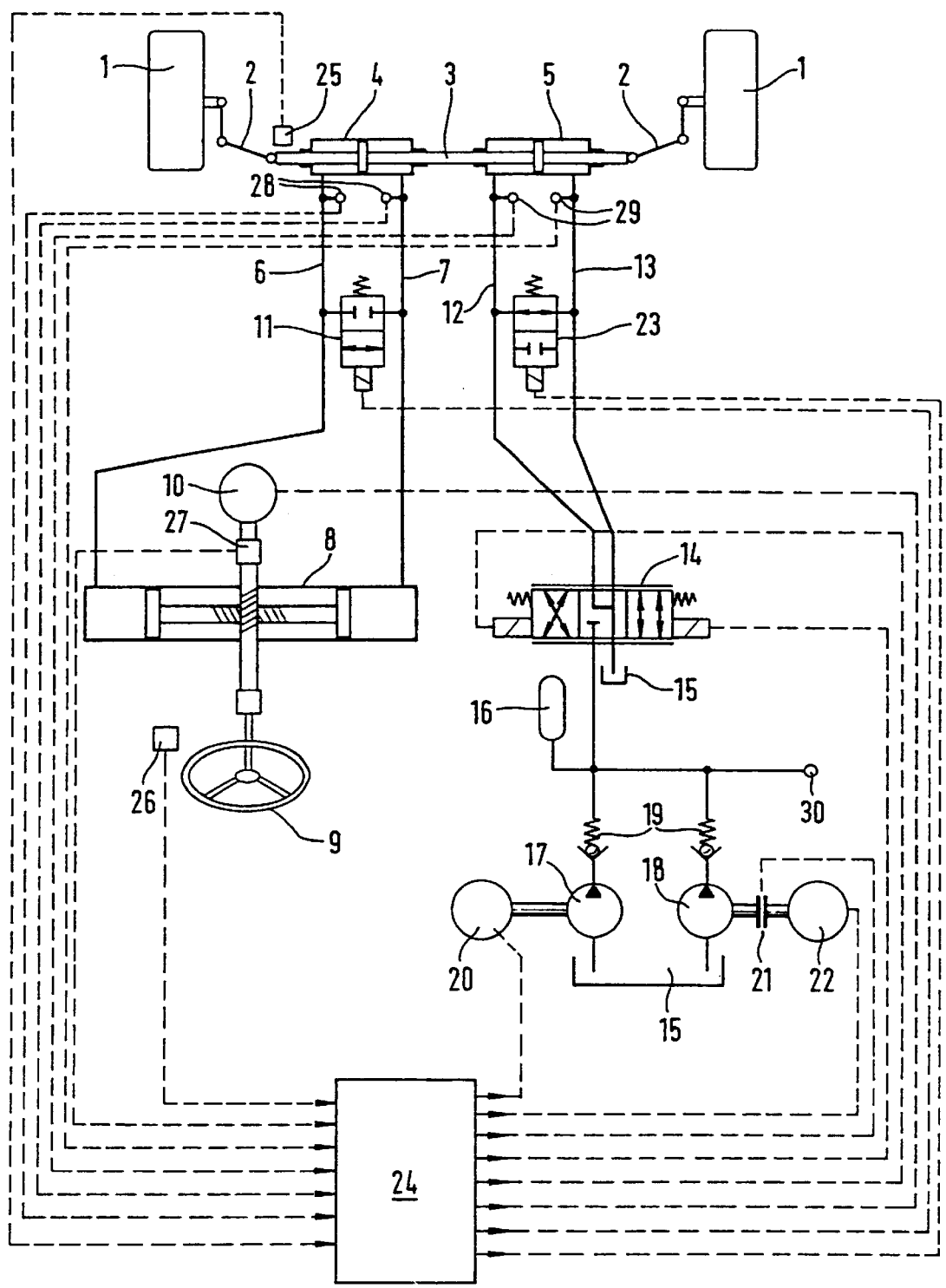
FIG. 1 is a schematic diagram of a first embodiment of the present invention.

In the embodiment illustrated in FIG. 1, a motor vehicle has steerable front wheels 1 which are coupled to one another by way of track rods 2 and a rod 3 to allow steering. The rod 3 forms the piston rod of two piston-cylinder units 4, 5 which are arranged parallel to one another and are each double-acting units.

The piston-cylinder unit 4 is coupled via two hydraulic lines 6, 7 to the two piston working spaces of a double-acting piston-cylinder unit 8, the pistons of which are positively coupled mechanically to a steering wheel 9. The pistons of the unit 8 are displaced to the right and left when the steering wheel is turned clockwise and counterclockwise, respectively. When the pistons of the piston-cylinder unit 8 are displaced, the steering wheel is turned accordingly.

The steering wheel 9 is furthermore connected in terms of drive to a non-self-locking electric motor 10 which, with the motor shaft held fast, can operate as a pure force generator whose purpose will be explained below.

A normally closed shut-off valve 11 is arranged between the hydraulic lines 6, 7 and can be switched out of the closed position shown into its open position against the force of a return spring by energizing its actuating magnet and automatically moved into the closed position shown or held in this position by the return spring when the electric current acting on the actuating magnet is switched off.

The piston-cylinder unit 5 is connected by hydraulic lines 12, 13 to two connections of a control valve 14, which is connected by two further connections to a relatively unpressurized hydraulic reservoir 15 and a hydraulic pressure source, in the embodiment shown a hydraulic accumulator 16 and pumps 17, 18. The accumulator 16 can be recharged by the pump 17 and a further pump 18. Both pumps 17, 18 are protected by non-return valves 19 against backflow from the delivery side to their inlet side and connected on the inlet side to the reservoir 15. The pump 17 is driven by an electric motor 20. The pump 18 can be connected to the engine 22 of the motor vehicle by a clutch 21.

A normally open shut-off valve 23 arranged between the hydraulic line 12, 13 and can be moved out of the open position shown into its closed position or held in this closed position against the force of a return spring by electrical energization of its actuating magnet.

An electronic regulating and control arrangement 24 is connected on the input side to a transmitter 25 for the actual value of the steering angle of the front wheels 1. This transmitter 25 can, for example, interact with the rod 3, which executes an actuating stroke analogous to the steering angle when the wheels 1 are turned.

The input side of the regulating and control arrangement 24 is furthermore connected to a transmitter 26 for the desired value of the steering angle, this transmitter being actuated by the steering wheel 9. The input side of the regulating and control arrangement 24 is moreover connected to a torque sensor 27 which records the forces or moments transmitted between the steering wheel 9 and the electric motor 10.

Finally, the input side of the regulating and control arrangement 24 is connected to a multiplicity of pressure sensors 28, 29 and 30. The signals of these sensors represent the hydraulic pressures in the hydraulic lines 6, 7 and 12, 13 and the pressure at the pressure inlet of the control valve 14 respectively.

On the output side, the regulating and control arrangement 24 is connected to the actuating magnets of the shut-off valves 11 and 23 and of the control valve 14. The output of the regulating and control arrangement also controls the electric motors 10, 20 and the clutch 21.

In normal operation, the regulating and control arrangement 24 moves and holds the changeover valves 11, 23 by energizing the actuating magnets assigned to the abovementioned valves 11, 23. Accordingly, the piston-cylinder unit 4 is hydraulically decoupled from the piston-cylinder unit 8 and from the steering wheel 9. The pressure difference between the two piston working spaces of piston-cylinder unit 5 is controlled by actuation of the control valve 14, more specifically in the manner described below.

Via the transmitter 25, the regulating and control arrangement 24 records the actual value of the steering angle of the front wheels 1. Via the transmitter 26 actuated by the steering wheel, the regulating and control arrangement 24 receives the desired value of the steering angle. The actuating magnets of the control valve 14 are then controlled in accordance with a desired/actual value comparison carried out by the regulating and control arrangement 24.

If there is no desired/actual value deviation, the control valve 14 remains in the illustrated central position, in which the piston-cylinder unit 5 is switched hydraulically to the free-running mode and connected to the reservoir 15, while the accumulator 16, which is recharged continuously as required by the pump 17 or 18 as a function of the signal from the pressure sensor 30, is shut off from piston-cylinder unit 5.

If a desired/actual value deviation occurs, the control valve 14 is displaced to the right or left out of the central position shown, depending on the direction of the desired/actual value deviation. As a result, one piston working space of the piston-cylinder unit 5 is connected to the delivery port of the control valve 14 and the other piston working space of the unit 5 is connected controllably to the reservoir 15 and a controllable pressure difference takes effect at the piston-cylinder unit 5. Consequently, the result that the piston-cylinder unit 5 produces an actuating force in a direction determined by the direction of the desired/actual value deviation of the steering angle. In this way, a desired/actual value deviation of the steering value is eliminated quickly and the front wheels 1 follow the turning of the steering wheel 9.

From the signals of the pressure sensors 29 and/or from the electrical voltages and current intensities at the actuating magnets of the control valve 14, the regulating and control arrangement 24 can directly or indirectly determine the pressure difference acting at the piston-cylinder unit 5. The extent of the pressure difference is correlated with the forces or moments transmitted between the steered wheels 1 and the piston-cylinder unit 5. In correlation with these forces, the regulating and control arrangement 24 determines a desired value for a hand force that can be felt at the steering wheel 9 and sets it by corresponding activation of the electric motor 10. The torque sensor 27 recording the forces or moments acts between the electric motor 10 and the steering wheel 9 and hence the actual value of the hand force. Consequently, the engine 10 is regulated as a function of a desired/actual value comparison for the hand forces. In this way, the driver is provided with haptic feedback at the steering wheel 9 on the forces acting between the steered vehicle wheels 1 and the piston-cylinder unit 5.

The regulating and control arrangement 24 monitors itself continuously for correct operation. In addition, the signals from the transmitters and sensors 25 to 30 connected to the input side of the regulating and control arrangement 24 are checked continuously for plausibility. If a system fault is detected, the actuating magnet of the shut-off valve 11 is de-energized, with the result that the shut-off valve 11 switches to the closed position shown in FIG. 1 and the piston-cylinder units 4 and 8 and hence the steerable front wheels 1 and the steering wheel 9 are positively coupled to one another hydraulically.

Because the regulating and control arrangement 24 carries out a continuous comparison between the desired value recorded by the sensor 26 and the actual value of the steering angle, recorded by the sensor 25, for the purpose of controlling the control valve 14, it is also achievable, with appropriate programming or configuration of the regulating and control arrangement 24, to record characteristic values for the desired/actual value deviation, as explained at the outset.

If these characteristic variables indicate a system fault, the steering wheel 9 and the steerable front wheels 1 are positively coupled to one another.

This occurs, for example, if the desired/actual value deviation exceeds a first threshold value. This can be specified in a parameter-dependent manner and, for example, be reduced if the actuating forces of the piston-cylinder unit 5 recorded by the pressure sensor 29 fall or assume vanishingly small values. The regulating and control arrangement 24 can furthermore be coupled directly or indirectly to a measuring element (not shown) for the speed of travel of the vehicle, allowing the abovementioned threshold value also to be lowered when the speed of travel increases. Consequently, the steered wheels 1 are ensured to follow in a particularly accurate manner the actuating displacements of the steering wheel 9 brought about by the driver at a relatively high speed of travel or in the case of small externally acting steering forces, e.g. those during normal straight-ahead travel.

In addition or as an alternative, provision can be made to activate the positive coupling between the steered wheels 1 and the steering wheel 9 if a deviation exceeding a second threshold value between the desired value and the actual value of the steering angle is maintained for a predetermined time. The time or the second threshold value can be reduced with increasing speed of travel and/or decreasing actuating forces of the piston-cylinder unit 5. If the value specified for the second threshold is sufficiently small, the desired/actual value deviation is ensured lie within a narrow tolerance band in the long term.

Finally, in addition or as an alternative, provision can be made to switch on the positive coupling if the time average of the desired/actual value deviation exceeds a third threshold during a predetermined second time. This approach allows only a limited growth in the desired/actual value deviation and a rapid reduction in a previous growth of the desired/actual value deviation.

Figure 2:
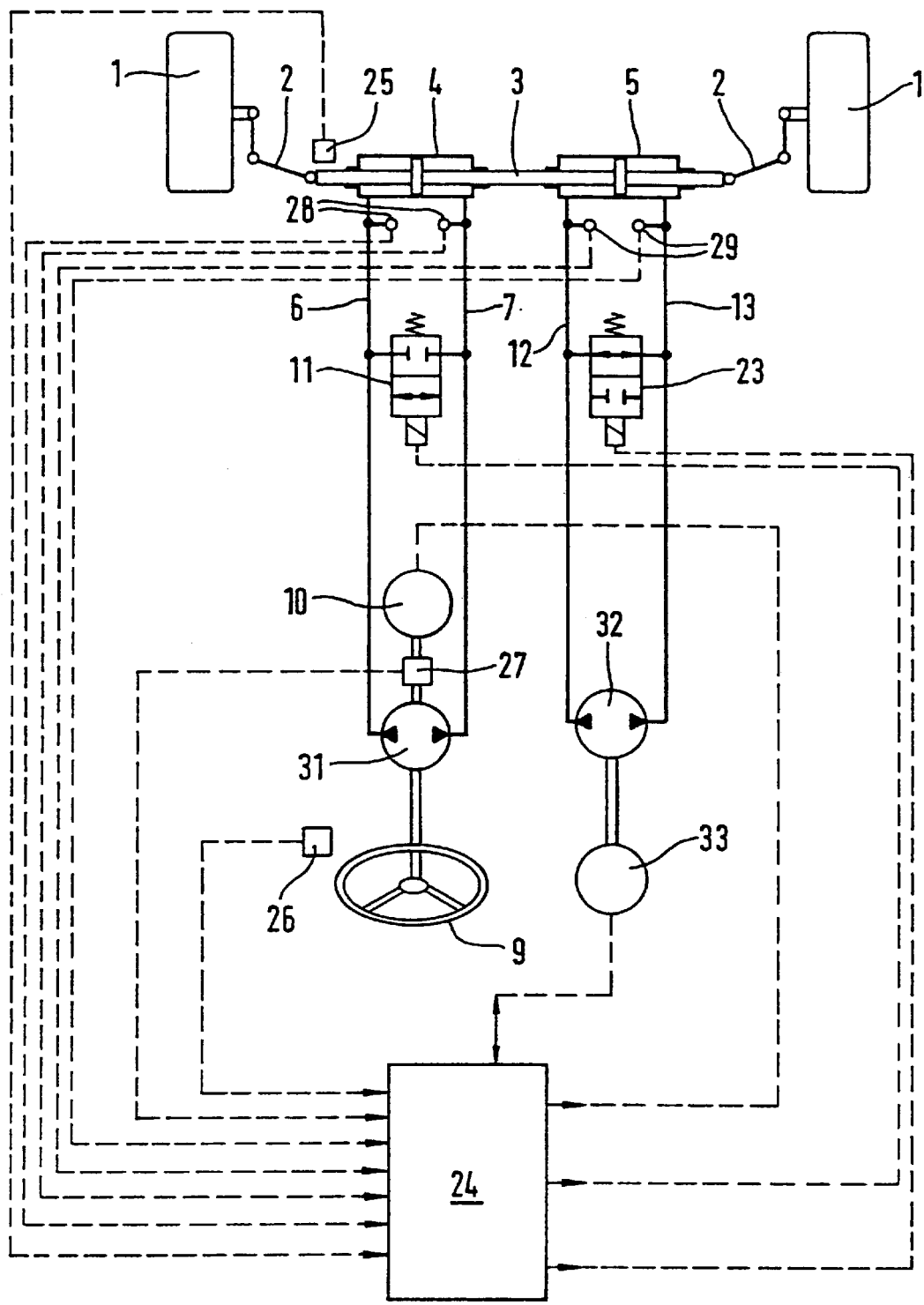
FIG. 2 is a schematic view of a second embodiment.

The embodiment illustrated in FIG. 2 differs from the arrangement shown in FIG. 1 essentially in that piston-cylinder unit 6 has been replaced by a hydrostatic reversible pump 31. Thereby, the hydraulic medium can be exchanged between hydraulic lines 6, 7. In drive terms, this pump 31 is positively coupled, on one hand, to the electric motor 10 and, on the other hand, to the steering wheel 9.

In addition, another reversible and, preferably, likewise hydrostatic pump 32 can connect hydraulic lines 12, 13. This pump is driven by an electric motor 33 actuated by the regulating and control arrangement 24.

The embodiment in FIG. 2 operates substantially the same as the embodiment shown in FIG. 1. That is, when the changeover value 11 assumes its closed position, the hydrostatic pump 31 and piston-cylinder unit 4 and hence the steerable vehicle wheels 1 and the steering wheel 9 are positively coupled to one another.

This positive coupling is performed if the regulating and control arrangement 24 detects a malfunction in the steering system. If, in such a situation, there is a malfunction in parts of the hydraulic system of piston-cylinder unit 5 or this seems possible, the power supply to the magnet of the changeover valve 23 is automatically switched off, with the result that the changeover valve 23 switches to the open position shown in FIG. 2 and piston-cylinder unit 5 is switched hydraulically to the free-running mode in all circumstances.

In normal operation, i.e. when the regulating and control arrangement 24 does not detect any malfunctions, the changeover valves 11, 23 are held in positions by the regulating and control arrangement 24. The electric motor 33 is then operated by the regulating and control arrangement in one or other direction with a higher or lower actuating force as a function of a desired/actual value comparison of the steering angle, i.e. as a function of the difference between the signals of transmitters 25 and 26, with the result that piston-cylinder unit 5 transmits a corresponding actuating force to the steered wheels 1.

Otherwise, the desired/actual value deviation of the steering angle is again monitored in the same way as was described above for the embodiment in FIG. 1. As soon as characteristic variables of the desired/actual value deviation are outside predetermined tolerance thresholds, the steering wheel 9 and the steered wheels 1 are positively coupled to one another.

Figure 3:
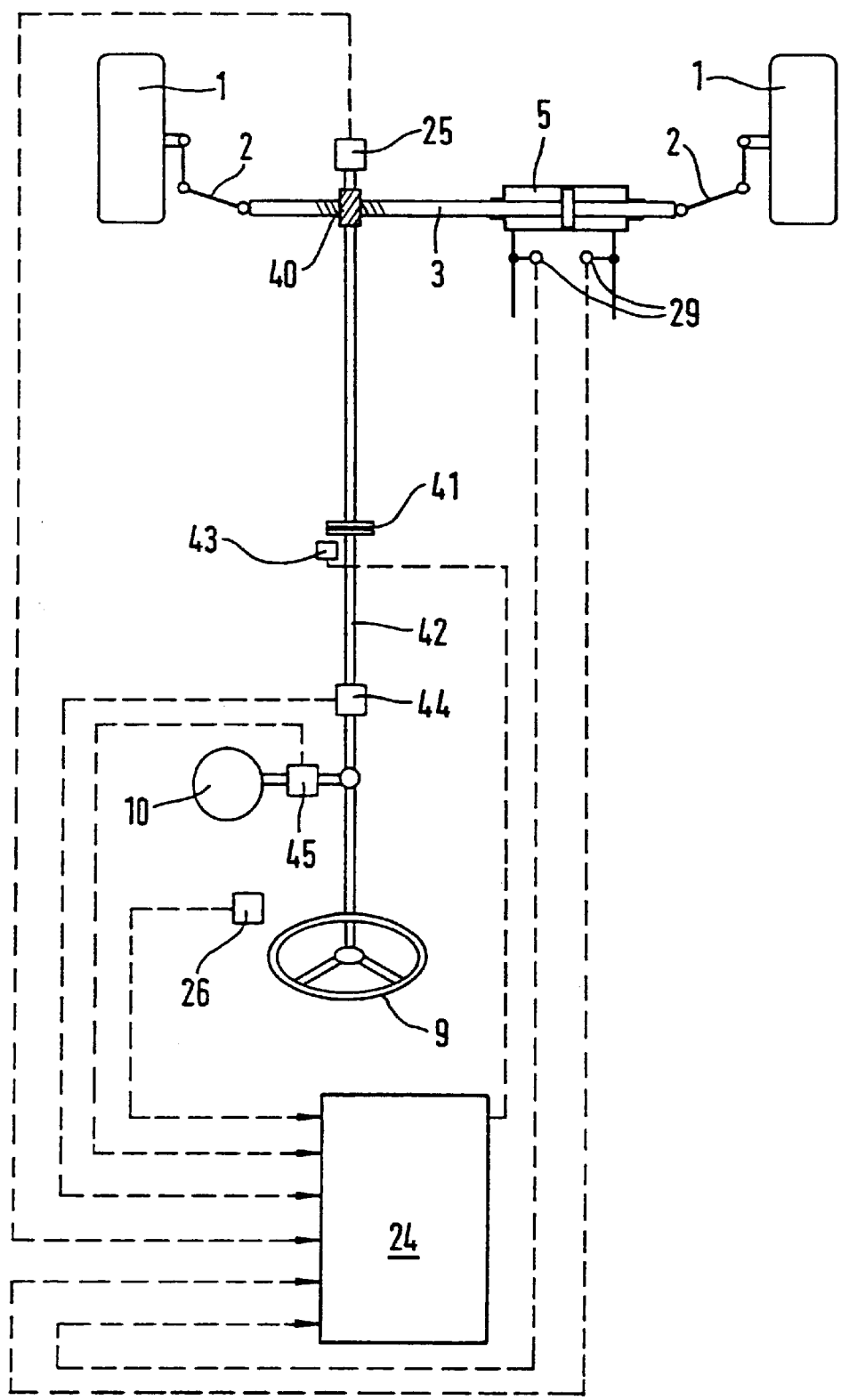
FIG. 3 is a schematic view of a third embodiment of the invention.

The embodiment shown in FIG. 3 differs from the embodiments described above first in that a mechanical direct drive between the steering wheel 9 and the steered vehicle wheels 1 is provided for emergencies.

In the embodiment shown, the rod 3 is for this purpose arranged as a rack which meshes with a pinion 40 that, for its part, is connected mechanically to the steering wheel 9 via a clutch 41 spring-loaded in the closing direction and an adjoining shaft 42. The clutch 41 can be disengaged against the force of its closing spring by an actuating motor 43 in order to disengage the mechanical direct drive between the steered vehicle wheels and the steering wheel 9. In drive terms, the shaft 42 is furthermore connected (in a non-self-locking manner) to the non-self-locking electric motor 10. Respective torque sensors 44, 45 are arranged between the steering wheel 9 and the shaft 42 and between the electric motor 10 and the shaft 42.

For the purpose of determining the actual steering-angle value, the pinion 40 is connected to the transmitter 25, which is configured as an angle sensor. The shaft 42 is connected at the steering wheel 9 to the transmitter 26, which is likewise configured as an angle sensor and, during normal operation, serves as a desired steering-angle transmitter. Otherwise, the rod 3 again forms the piston rod of piston-cylinder unit 5, which once again can be actuated in accordance with the arrangement shown in FIG. 1 or 2.

In normal operation, the actuating motor 43 of the clutch 41 is continuously excited by the regulating and control arrangement 24 to hold the clutch 41 open against the force of its closing spring. The regulating and control arrangement 24 also actuates piston-cylinder unit 5 or the elements controlling this unit 5 such that the actuating forces produced by the unit 5 eliminate any difference between the desired steering-angle value supplied by transmitter 26 and the actual steering-angle value supplied by transmitter 25. In this connection, attention is drawn to the statements relating to FIGS. 1 and 2.

In the event of any system faults, the actuating motor 43 is switched off by the regulating and control arrangement 24. As a result, the clutch 41 engages and the steering wheel 9, and steered vehicle wheels 1 are positively coupled to one another.

In this third embodiment also, characteristic variables of the desired/actual value deviation of the steering angle are once again monitored in order, if necessary, to positively couple the steering wheel 9 and the steered wheels 1 to one another as explained for the embodiments in FIGS. 1 and 2.

As a deviation from the embodiments shown in the drawing, provision can also be made to arrange the torque sensors 27 in FIGS. 1 and 2 or 44 in FIG. 3 on the steering-wheel side of unit, 8, the pump 31 or electric motor 10 and of the sensor 45. This configuration can be advantageous because the signals of sensors 27, 44 are then affected less by friction that could be caused by unit 8, the pump 31 or the electric motor 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system for a non-track-bound motor vehicle, comprising:
   a steering handle configured to be actuatable by the driver;
   a steering actuating drive for steering displacement of steerable vehicle wheels of the vehicle;
   a desired steering-angle transmitter configured to be actuatable by the steering handle;
   an actual steering-angle transmitter configured to be actuatable by the steerable vehicle wheels;
   a regulating and control arrangement configured to control the steering actuating drive as a function of a comparison between a desired value and an actual value of the steering angle and to continuously check itself and sensors interacting therewith for malfunctions; and
   a mechanical or hydraulic positive coupling arranged between the steering handle and the steerable vehicle wheels and, in normal operation of the regulating and control arrangement, is opened or remains open and, in abnormal condition of the regulating and control arrangement, is automatically closed, wherein the regulating and control arrangement is configured to activate a special state in the event of at least one of a deviation which exceeds a first threshold value occurring between the desired value and the actual value of the steering angle, a deviation which exceeds a second threshold value being maintained between the desired value and the actual value of the steering angle for a specifiable time, and an average value of the desired/actual value deviation of the steering angle exceeding a third threshold value for a second specifiable time.

2. The steering system according to claim 1, wherein at least one of the threshold values and times are varied in a parameter-dependent manner.

3. The steering system according to claim 1, wherein at least one of the threshold values and the times are reduced as the speed of travel of the vehicle increases.

4. The steering system according to claim 3, wherein at least one of the threshold values and times are varied in a parameter-dependent manner.

5. The steering system according to claim 1, wherein at least one of the threshold values and the times are reduced as the actuating force of the actuating unit falls.

6. The steering system according to claim 5, wherein at least one of the threshold values and times are varied in a parameter-dependent manner.

7. The steering system according to claim 6, wherein at least one of the threshold values and the times are reduced as the speed of travel of the vehicle increases.

8. The steering system according to claim 1, wherein the desired/actual value deviation of the steering angle is determined from time-averaged or filtered values of one of the desired, actual value or corresponding averaged or filtered signals.

9. The steering system according to claim 8, wherein at least one of the threshold values and times are varied in a parameter-dependent manner.

10. The steering system according to claim 9, wherein at least one of the threshold values and the times are reduced as the speed of travel of the vehicle increases.

11. The steering system according to claim 10, wherein at least one of the threshold values and the times are reduced as the actuating force of the actuating unit falls.

* * * * *